United States Patent [19]

Yoshimoto et al.

[11] Patent Number: 5,180,567

[45] Date of Patent: Jan. 19, 1993

[54] EXHAUST GAS TREATING METHOD

[75] Inventors: Masafumi Yoshimoto, Sakai; Tadao Nakatsuji, Nara; Kimihiko Yoshida, Sakai, all of Japan

[73] Assignee: Sakai Chemical Industry Co., Ltd., Osaka, Japan

[21] Appl. No.: 663,947

[22] PCT Filed: Aug. 13, 1990

[86] PCT No.: PCT/JP90/01031
§ 371 Date: Mar. 7, 1981
§ 102(e) Date: Mar. 7, 1991

[87] PCT Pub. No.: WO91/01795
PCT Pub. Date: Feb. 21, 1991

[30] Foreign Application Priority Data

Aug. 11, 1989 [JP] Japan ..................... 1-209054

[51] Int. Cl.$^5$ ..................... B01J 8/00; C01B 17/00
[52] U.S. Cl. ..................... 423/239; 423/212
[58] Field of Search ..................... 423/239, 239 A, 212

[56] References Cited

U.S. PATENT DOCUMENTS

| | | | |
|---|---|---|---|
| 2,975,025 | 3/1961 | Cohn et al. | 423/239 |
| 3,929,965 | 12/1975 | Kim et al. | 423/239 |
| 4,009,242 | 2/1977 | Lauder et al. | 423/239 |
| 4,140,749 | 2/1979 | Baresel et al. | 423/239 |
| 4,160,805 | 7/1979 | Inaba et al. | 423/239 |

FOREIGN PATENT DOCUMENTS

| | | |
|---|---|---|
| 0092023 | 10/1983 | European Pat. Off. . |
| 0089199 | 9/1991 | European Pat. Off. . |
| 2373675 | 12/1976 | France . |
| 1493398 | 11/1977 | United Kingdom . |

OTHER PUBLICATIONS

Patent Abstracts of Japan, JP 63-242324 (A).

*Primary Examiner*—Gregory A. Heller
*Attorney, Agent, or Firm*—Nikaido, Marmelstein, Murray & Oram

[57] ABSTRACT

The present invention provides an exhaust gas treating method by which exhaust gas is passed through a catalyst layer at an areal velocity of 100 to 5000 m$^3$/m$^2$·hr to selectively produce carbon monoxide from particulates contained in the exhaust gas, so that nitrogen oxides contained in the exhaust gas are removed by the carbon monoxide thus produced. The exhaust gas treating method of the present invention can readily and securely remove particulates and nitrogen oxides contained in exhaust gas, i.e., two primary causes of air pollution, by merely passing the exhaust gas through a catalyst layer at a specific areal velocity.

6 Claims, 2 Drawing Sheets

EXHAUST GAS TREATING METHOD

DESCRIPTION

1. Technical Field

The present invention relates to an exhaust gas treating method of removing particulates and nitrogen oxides from exhaust gas discharged from a combustion engine such as a Diesel engine or the like.

2. Background Art

Exhaust gas discharged from a Diesel engine includes gas components such as nitrogen oxides (NOx), sulfur oxides, carbon monoxide and the like, and fine powder having a grain size of not greater than 1 $\mu m$ called particulates composed of soot (incomplete burnt carbon), soft or heavy hydrocarbon, sulfuric acid mist and the like.

The particulates are produced from the incomplete combustion of light oil serving as fuel of a Diesel engine or the like. The nitrogen oxides and the particulates are regarded as two primary causes of air pollution. It is therefore required to prevent the particulates and the nitrogen oxides from diffusing in the atmosphere.

In this connection, there are proposed various examples of a catalyst device of which catalyst filter carrying an oxidation catalyst is installed at the exhaust system of a Diesel engine so that the particulates from the Diesel engine come in contact with the catalyst filter, causing the particulates to be oxidized, decomposed and removed (See Japanese Unexamined Patent Publication 185425/1988, for example).

As a typical example of the catalyst device above-mentioned, there is known, as shown in FIG. 1, a catalyst filter F in which an oxidation catalyst is carried on a honeycomb structure 1 generally made of porous ceramics which has openings at the exhaust gas inlet side A and openings at the exhaust gas outlet side B, these openings at both sides A and B being alternately closed.

In the catalyst filter F, exhaust gas introduced from the inlet side A is forcibly passed through partition walls 2 made of porous ceramics and discharged outside from the outlet side B, as shown by arrows. When the exhaust gas is passed through the partition walls 2, particulates contained in the exhaust gas are caught by the partition walls 2 so that the particulates are oxidized and decomposed by the oxidation catalyst carried on the partition walls 2.

As the other primary cause of air pollution, nitrogen oxides which are to be removed by a reduction reaction, cannot be removed by the oxidation catalyst of the catalyst filter above-mentioned or the like. Accordingly, to remove both nitrogen oxides and particulates, both an oxidation catalyst and a reduction catalyst are required. This not only complicates the exhaust gas treating mechanism, but also involves the likelihood that the evacuation efficiency in a Diesel engine or the like is lowered.

In view of the foregoing, the present invention is proposed with the object of providing an exhaust gas treating method of readily and securely removing both nitrogen oxides and particulates contained in exhaust gas.

DISCLOSURE OF INVENTION

To solve the problems above-mentioned, the exhaust gas treating method in accordance with the present invention is characterized in that exhaust gas is passed through a catalyst layer at an areal velocity of 100 to 5000 $m^3/m^2$. hr to selectively monoxide from particulates contained in the exhaust gas, so that the particulates are removed and nitrogen oxides contained in the exhaust gas are removed by the carbon monoxide thus produced.

According to the present invention having the arrangement above-mentioned, when exhaust gas is passed through the catalyst layer at the areal velocity above-mentioned, incompletely burnt carbon or hydrocarbon in particulates contained in the exhaust gas is partially oxidized to selectively produce carbon monoxide, causing the particulates to be removed. Further, the carbon monoxide thus produced causes nitrogen oxides in the exhaust gas to be reduced and removed as decomposed into nitrogen and water.

In the specification, the term of areal velocity refers to a value obtained by dividing a space velocity, i.e., the flow velocity of exhaust gas passing through the catalyst (in unit of $hr^{-1}$), by the contact surface area per unit volume of the catalyst (in unit of $m^2/m^3$).

BEST MODE FOR CARRYING OUT THE INVENTION

No particular restrictions are imposed to the form of the catalyst used in the practice of the present invention as far as exhaust gas can pass therethrough. Accordingly, there may be used conventional various catalyst devices arranged such that particulates come in contact therewith, causing the same to be removed as oxidized.

Figure 1:
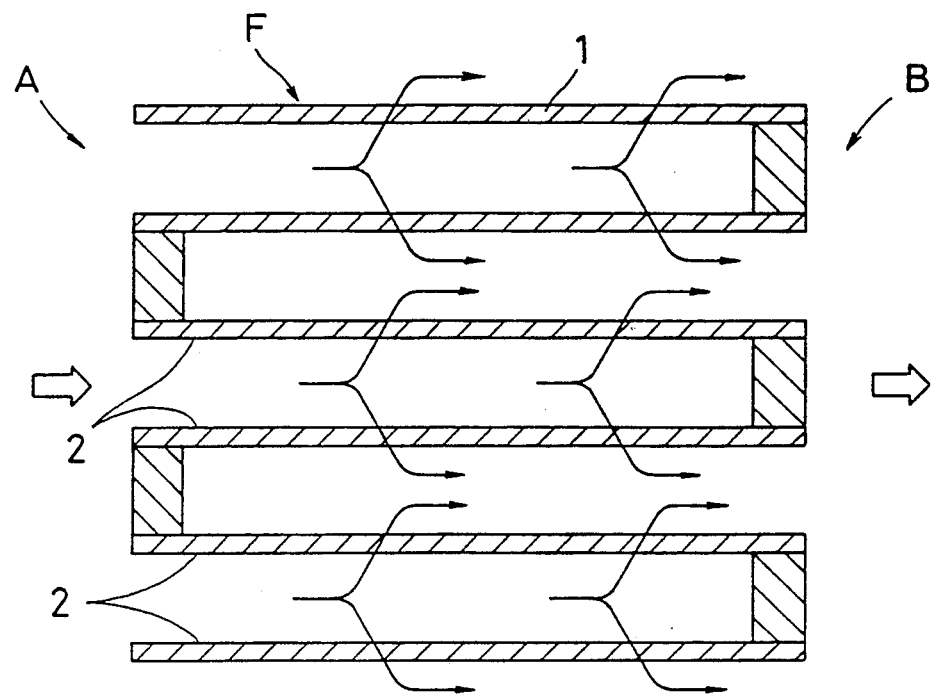
FIG. 1 is a section view of a catalyst filter formed by a honeycomb structure.
Figure 2:
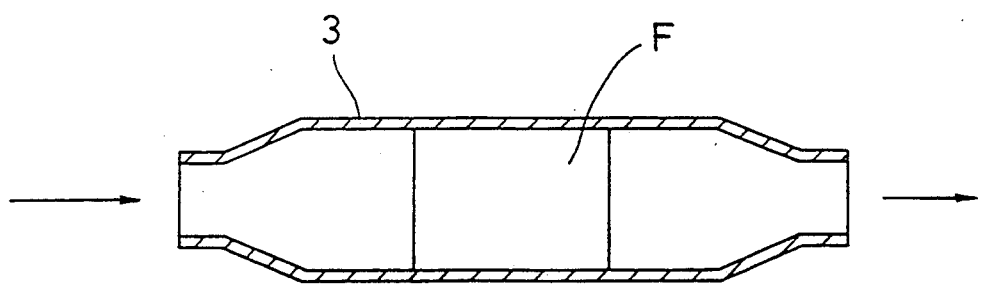
FIG. 2 is a section view of a catalyst device incorporating the catalyst filter in FIG. 1.
Figure 3:
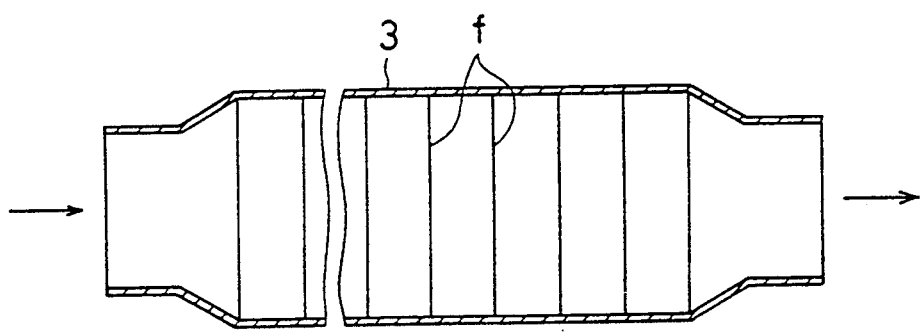
FIG. 3 is a section view of a catalyst device incorporating catalyst filters made of a wire net having a number of fine holes.

For example, there may be used a catalyst device as shown in FIG. 2 formed by mounting, in a case 3 having a predetermined shape, a catalyst filter F having the arrangement shown in FIG. 1 in which exhaust gas is adapted to be forcibly passed through partition walls 2 made of porous ceramics so that particulates are oxidized and decomposed. Also, there may be used a catalyst device as shown in FIG. 3 formed by mounting, in a case 3 having a predetermined shape, a plurality of catalyst filters f each made of a wire net or metallic sheet having, in the thickness direction, a plurality of fine holes with a diameter of not less than 30 $\mu m$, the wire net or metallic sheet carrying a catalyst.

In the catalyst device in the form shown in FIG. 1, if exhaust gas comes in contact with the catalyst for a prolonged period of time, sulfur oxides contained in exhaust gas are oxidized by the catalyst so that the sulfur oxides are transformed into either sulfate which brings about acid rain, or sulfuric acid mist which becomes secondary particulates. To prevent such oxidation, it is preferred that the catalyst is carried on only the surface layer portions of the partition walls 2 (of which the thickness from the wall surfaces is in a range from about 5 to about 100 $\mu m$) by which the particulates are to be caught.

The areal velocity of exhaust gas passing through the catalyst layers should be limited to a range from 100 to 5000 $m^3/m^2$ hr. More specifically, if the areal velocity is less than 100 m$^3$/m$^2$. hr, the period of time during which exhaust gas comes in contact with the catalyst layers is too long. Accordingly, the oxidation of incompletely burnt carbon or hydrocarbon contained in particulates is not limited to partial oxidation, but proceeds to such an extent as to produce carbon dioxide. Therefore, the amount of the carbon monoxide is insufficient, failing to fully remove nitrogen oxides in the exhaust gas. Further, the oxidation of sulfur oxides contained in the exhaust gas proceeds to produce sulfuric acid mist which becomes secondary particulates. This rather increases the ratio of particulates in the exhaust gas. On the contrary, if the aereal velocity exceeds 5000 m$^3$/m$^2$. hr, the period of time during which exhaust gas comes in contact with the catalyst layers is too short. This prevents the particulates from being sufficiently oxidized, failing to sufficiently remove both the particulates and the nitrogen oxides.

Examples of the catalyst to be used in the present invention include: noble metal such as ruthenium, platinum, palladium, rhodium and the like; oxides and composite oxides of base metal such as iron, chromium, copper, cobalt, manganese, nickel and the like; perovskite oxides such as LaCoO$_3$ and the like.

INDUSTRIAL APPLICABILITY

According to the exhaust gas treating method of the present invention, particulates and nitrogen oxides contained in exhaust gas, i.e., two primary causes of air pollution, can be readily and securely removed by merely passing the exhaust gas through a catalyst layer at a specific areal velocity. This eliminates such problems encountered in conventional methods as the complication of an exhaust gas treating mechanism jointly using an oxidation catalyst and a reduction catalyst, the deterioration of evacuation efficiency in a Diesel engine or the like, Further, the method of the present invention greatly contributes to the prevention of air pollution.

EXAMPLES

The following description will discuss the present invention with reference to Examples thereof and Comparative Examples.

EXAMPLE 1

10 Kg of activated alumina (A-11 manufactured by Sumitomo Chemical Co., Ltd.), 1 kg of kibushi clay and 500 g of methyl cellulose were mixed in a dry state, and water was then added to the mixture. The resultant mixture was sufficiently kneaded. With the use of an extruder of the auger screw type having a honeycomb die having a pitch of 1.3 mm and a wall thickness of 0.3 mm, the kneaded body was extruded and molded in the form of a honeycomb. After dried with a drier of the ventilation type, the resultant honeycomb body was put in an electric kiln, of which temperature was raised to 800° C. at a temperature raising ratio of 5° C. per hour. The honeycomb body was burning for one hour at 800° C. to prepare a cylindrical honeycomb structure having a number of honeycomb holes and a diameter of 190 mm.

Slurry was prepared by adding 1000 g of activated alumina (A-11 manufactured by Sumitomo Chemical Co., Ltd.) to 1 l of water in which 5 g of ruthenium chloride had been dissolved. The slurry was dried and pulverized with a spray drier and then calcined in a nitrogen stream for one hour at 500° C. to prepare calcined powder. Together with 10 g of silica sol (Snowtex-O manufactured by Nissan Chemical Industries, Ltd.), 100 g of the calcined powder was added to 500 g of water to prepare a catalyst-layer coating solution in the form of slurry.

The honeycomb structure was immersed in the catalyst-layer coating solution to apply the coating solution onto the surfaces of the honeycomb structure. Air was blown to the honeycomb structure to remove the excessive application of the coating solution. The honeycomb structure was dried with a drier of the ventilation type to prepare an alumina-ruthenium carrying honeycomb structure. The alumina-ruthenium layers serving as catalyst layers carried on the honeycomb structure had a thickness of about 20 μm. According to a geometrical calculation, the specific contact area of each alumina-ruthenium layer was 1190 m$^2$/m$^3$.

The cylindrical alumina-ruthenium carrying honeycomb structure was cut into round slices each having a thickness of 17 mm. There was prepared a catalyst filter F, as shown in FIG. 1, of the type in which exhaust gas is adapted to be forcibly passed through partition walls 2, with half the number of entire honeycomb holes closed at one side of the filter F with alumina cement and the other half the number of entire honeycomb holes closed at the other side of the filter F with alumina cement.

As shown in FIG. 2, the catalyst filter F thus prepared was mounted in a case 3 to make a catalyst device.

EXAMPLE 2

There was prepared a catalyst filter, which was then mounted in a case to make a catalyst device in the same manner as in Example 1, except that the cylindrical alumina-ruthenium carrying honeycomb structure above-mentioned was cut into round slices each having a thickness of 35 mm.

EXAMPLE 3

There was prepared a catalyst filter, which was then mounted in a case to make a catalyst device in the same manner as in Example 1, except that the cylindrical alumina-ruthenium carrying honeycomb structure above-mentioned was cut into round slices each having a thickness of 105 mm.

COMPARATIVE EXAMPLE 1

There was prepared a catalyst filter, which was then mounted in a case to make a catalyst device in the same manner as in Example 1, except that the cylindrical alumina-ruthenium carrying honeycomb structure above-mentioned was cut into round slices each having a thickness of 300 mm.

EXAMPLES 4 TO 9

Slurry was prepared by adding 1000 g of activated alumina (A-11 manufactured by Sumitomo Chemical Co., Ltd.) to 1 l of water in which 5 g of platinic chloride had been dissolved. The slurry was dried and pulverized with a spray drier and then calcined in a nitrogen stream for one hour at 500° C. to prepare calcined powder. Together with 10 g of silica sol (Snowtex-O manufactured by Nissan Chemical Industries, Ltd.), 100 g of the calcined powder was added to 500 g of water to prepare a catalyst-layer coating solution in the form of slurry.

Cylindrical honeycomb structures, each of which was identical with that used in Example 1 having a diameter of 190 mm and a number of honeycomb holes, were subjected to immersion in the catalyst-layer coating solution above-mentioned, air blowing to remove the excessive application of the coating solution and drying with a drier of the ventilation type. The honeycomb structures were then calcined in a nitrogen stream for one hour at 500° C. and then in a nitrogen-hydrogen (1:1) stream for one hour at 500° C., thereby to prepare alumina-platinum carrying honeycomb structures having, as catalyst layers, alumina-platinum layers respectively having the thicknesses shown in Table 1.

Each of the cylindrical alumina-platinum carrying honeycomb structure thus prepared was cut into round slices each having a thickness of 17 mm. In the same manner as in Example 1, there were prepared catalyst filters, which were then respectively mounted in cases to make catalyst devices.

TABLE 1

| | Thickness of Alumina-Platinum Layer |
|---|---|
| Example 4 | 10 μm |
| Example 5 | 25 μm |
| Example 6 | 50 μm |
| Example 7 | 75 μm |
| Example 8 | 100 μm |
| Example 9 | 200 μm |

EXAMPLE 10

A wire net made of stainless steel (SUS 304) having a wire diameter of 260 μm and meshes of 420 μm was cut into a disk having a diameter of 190 mm. The disk-like wire net was degreased as heated for 30 minutes at 400° C. The wire net was then immersed in a catalyst-layer coating solution identical with that used in Examples 4 to 9 to prepare a catalyst filter made of an alumina-ruthenium carrying wire net. The ratio of the catalyst carried on the wire net was 9.8%.

As shown in FIG. 3, ten catalyst filters f each of which was made in the manner above-mentioned were mounted, at regular spatial intervals of 5 mm, in a case 3 to make a catalyst device.

COMPARATIVE EXAMPLE 2

A catalyst device was made in the same manner as in Example 10, except that two catalyst filters made of the alumina-ruthenium carrying wire net prepared in Example 10, were mounted in a case at regular spatial intervals of 5 mm.

EXAMPLE 11

A wire net made of stainless steel (SUS 304) having a wire diameter of 260 μm and meshes of 420 μm was cut into a disk having a diameter of 190 mm. The disk-like wire net was degreased as heated for 30 minutes at 400° C. The wire net was spray-coated at the surfaces thereof with 50 g of alumina, and then immersed in a mixed aqueous solution containing copper nitrate, chromium nitrate and manganese nitrate at a ratio by weight of 2.7: 2.0: 95.3 in terms of oxides, thereby to prepare a catalyst filter made of an alumina-metallic oxide carrying wire net. The ratio of the total carried metallic oxides (three components) with respect to carried alumina was 5% by weight.

As shown in FIG. 3, ten catalyst filters f each of which was made in the manner above-mentioned were mounted, at regular spatial intervals of 5 mm, in a case 3 to make a catalyst device.

EXAMPLE 12

A mixed aqueous solution containing lanthanum acetate, cobalt acetate and zirconium hydroxide at a ratio by weight of 2.7: 2.0 : 95.3 in terms of oxides, was evaporated and solidified. The resultant solid body was calcined in air for one hour at 850° C. to prepare a perovskite oxide ($LaCoO_3/ZrO_2$). The perovskite oxide was pulverized with the use of a sample mill.

Together with 10 g of silica sol (Snowtex-O manufactured by Nissan Chemical Industries, Ltd.), 100 g of the pulverized powder was added to 500 g of water to prepare a catalyst-layer coating solution in the form of slurry. Then, there was made, in the same manner as in Example 10, a catalyst filter made of a $LaCoO_3/ZrO_2$ carrying wire net. The ratio of the catalyst carried on the wire net was 8.5%.

As shown in FIG. 3, ten catalyst filters f each of which was prepared in the manner above-mentioned, were mounted, at regular spatial intervals of 5 mm, in a case 3 to make a catalyst device.

EVALUATION TEST

Each of the catalyst devices of Examples and Comparative Examples thus prepared was mounted on the downstream part of a Diesel engine (6HADK manufactured by Yanmar Diesel Engine Co., Ltd.) presenting a stroke volume of 12 l and an exhaust gas amount of 700 $Nm^3$/hr.

While each catalyst device was heated from the outside to adjust the reaction temperature, the Diesel engine was operated at the number of revolutions of 2000 r.p.m. and under drive torque of 100 kg.m. Under the operting conditions above-mentioned, the exhaust gas presented the following composition:

Nitrogen oxides (NOx) 500 ppm
Sulfur oxides ($SO_2$) 150 ppm
Carbon monoxide 300 ppm
Oxygen 5%
Water 10%

The average concentration of particulates in the exhaust gas was 1.0 g/$Nm^3$.

While the Diesel engine was operated under the conditions above-mentioned, there were obtained the ratios of the particulates and the nitrogen oxides removed by each catalyst device.

The particulate removal ratio was obtained as follows. With the use of a so-called dilution tunnel method by which the exhaust gas from a Diesel engine is diluted to generate a situation similar to that generated at the time when the exhaust gas is actually discharged to the atmosphere, and the amount of particulates is measured in such a situation (See "Investigation of Documents relating to Technique of Lowering Black Smoke from Diesel Engine" published by Nihon Kagaku Gijyutsu Jyoho Center in March 1984), there was measured the weight of fine powder collected by the filter having a thickness of 47 μm mounted on the outlet of each catalyst device. Based on the value thus obtained, the particulate removal ratio was calculated.

The nitrogen oxide removal ratio was calculated from the measured result of nitrogen oxides by an NOx analyzer.

The results are shown in Table 2.

TABLE 2

| | Areal Velocity (m³/m² · hr) | Particulate Removal Ratio (%) | Nitrogen Oxide Removal Ratio (%) |
|---|---|---|---|
| Example 1 | 2964 | 30.1 | 19.9 |
| Example 2 | 988 | 62.0 | 41.4 |
| Example 3 | 282 | 55.2 | 23.8 |
| Comparative Example 1 | 99 | −10.3 | 3.8 |
| Example 4 | 988 | 42.8 | 25.0 |
| Example 5 | 988 | 53.2 | 40.7 |
| Example 6 | 988 | 57.5 | 56.9 |
| Example 7 | 988 | 53.1 | 62.3 |
| Example 8 | 988 | 32.6 | 54.2 |
| Example 9 | 988 | 8.1 | 26.8 |
| Example 10 | 3527 | 73.6 | 69.3 |
| Comparative Example 2 | 17635 | 6.7 | 9.2 |
| Example 11 | 3527 | 59.8 | 44.0 |
| Example 12 | 3527 | 60.7 | 40.9 |

As apparent from Table 2, with Comparative Example 1 where the exhaust gas areal velocity was not greater than 100 m³/m². hr, the particulates were rather increased in amount and the nitrogen oxides were not sufficiently removed. With each of Examples 1 to 3 where there was used the catalyst filter made of the alumina-ruthenium carrying honeycomb structure identical with that used in Comparative Example 1 and where the exhaust gas areal velocity was in a range from 100 to 5000 m³/m². hr, the particulates and the nitrogen oxides were sufficiently removed. From the results of Example 10 and Comparative Example 2, it was found that, if the exhaust gas areal velocity exceeded 5000 m³/m². hr even though the catalyst filter made of the same alumina-ruthenium carrying wire net was used, the removal ratios of particulates and nitrogen oxides were considerably lowered. From the results of Examples 4 to 9, it was found that, if the thickness of the alumina-platinum catalyst layer exceeded 100 μm even though the catalyst filter made of the same alumina-platinum carrying honeycomb structure was used, the particulate removal ratio was lowered. Thus, it was found that, when a honeycomb structure was used, it was preferable that the thickness of the catalyst layer was not greater than 100 μm.

From the entire results in Table 2, it is found that the exhaust gas treating method of the present invention may be applied to various catalyst devices in which various catalyst layers are carried.

We claim:

1. In the method of treating an exhaust gas containing particles of hydrocarbonaceous and carbonaceous matter, well as nitrogen oxides, by passing said gas through a catalyst comprising oxidation catalyst means under conditions sufficient to entrap and oxidize said carbonaceous particles, the improvement, whereby removing both said nitrogen oxides and particulates, which comprises passing said exhaust gas through said catalyst at an areal velocity of 100 to 5,000 m³/hr² under a combinaton of conditions sufficient to partially oxidize said hydrocarbonaceous and carbonaceous matter in said particles to an oxidation product comprising carbon monoxide and water, and reacting said nitrogen oxides with said carbon monoxide sufficient to reduce said nitrogen oxides and to oxidize said carbon monoxide.

2. An improved method as claimed in claim 1 wherein said oxidation catalyst is at least one member selected from the group consisting of a noble metal, a base metal oxide, a composite metal oxide, and a perovskite crystal.

3. An improved method as claimed in claim 1 wherein said catalyst comprises an aluminum-platinum layer carried on the surface portion of a honeycomb structure.

4. An improved method as claimed in claim 3 wherein the thickness of said aluminum-platinum layer is not greater that 100 μm.

5. An improved method as claimed in claim 1 wherein said catalyst is carried on a wire net.

6. An improved method as claimed in claim 1 wherein said catalyst is carried on a metal sheet perforated with fine holes.

* * * * *